United States Patent [19]

Haga

[11] Patent Number: 5,214,552
[45] Date of Patent: May 25, 1993

[54] ACTUATOR FOR MOVING RECORDING HEAD AND METHOD FOR PRODUCING THE SAME

[75] Inventor: Yosuke Haga, Tokyo, Japan

[73] Assignee: Teac Corporation, Japan

[21] Appl. No.: 641,525

[22] Filed: Jan. 15, 1991

[30] Foreign Application Priority Data

Jan. 16, 1990 [JP] Japan .................................. 2-2569[U]

[51] Int. Cl.$^5$ ......................... G11B 5/48; G11B 21/16
[52] U.S. Cl. .................................... 360/106; 360/104
[58] Field of Search ............ 360/105, 106, 104, 97.01, 360/104

[56] References Cited

U.S. PATENT DOCUMENTS

| 4,713,703 | 12/1987 | Asano | 360/106 X |
| 4,965,684 | 10/1990 | Stefansky | 360/105 X |
| 4,984,115 | 1/1991 | Takahashi et al. | 360/99.08 |
| 5,027,242 | 6/1991 | Nishida et al. | 360/106 |
| 5,161,077 | 11/1992 | Jabbari | 360/106 |

Primary Examiner—John H. Wolff
Attorney, Agent, or Firm—Andrus, Sceales, Starke & Sawall

[57] ABSTRACT

An actuator for moving a recording head in a radial direction of a recording disc includes a first member and a second member. The first member has a first actuator body and a driving coil adhered to said first actuator body by a adhesive, and the second member has a second actuator body and a bearing mechanism which is provided to said second actuator body. The recording head is mounted on at least either said first actuator body or the second actuator body, and said first member and the second member pivot on said shaft which is fixed on a base and is engaged with said bearing mechanism of said second member due to an operation of said driving device of said first member so that the recording head is moved in the radial direction of said recording disc. In the production of the actuator, the first member and the second member separately produced and then the first member and second member integrated with each other.

9 Claims, 5 Drawing Sheets

ACTUATOR FOR MOVING RECORDING HEAD AND METHOD FOR PRODUCING THE SAME

BACKGROUND OF THE INVENTION

The present invention generally relates to an actuator for moving a recording head and a method for producing the same, and more particularly to an actuator for moving a recording head, such as a magnetic head, which writes information on a disc recording medium, such as a magnetic disc, and/or reads the information therefrom and a method for producing the same.

For example, in a magnetic disc apparatus having a magnetic disc, such as a hard disc, in which information is stored, a pivoting type actuator moves a magnetic head in a radial direction of the magnetic disc. The magnetic head is located adjacent to the surface of the magnetic disc so as to write the information on the magnetic disc and/or read the information therefrom. The structure of this type of actuator is shown in FIG. 1. In FIG. 1, an actuator 1 has an actuator body 2, a driving coil 3 and a permanent magnet 4. A front end portion 2a of the actuator body 2 is provided with an arm (not shown in FIG. 1) having the magnetic head and rear end portion 2b of the actuator body 2a is provided with the driving coil 3. The driving coil 3 is adhered to the rear end portion 2b of the actuator body 2. A concave portion 2c is formed on an medium portion of the actuator body 2. Bearings 5 are engaged with the concave portion 2c. The permanent magnet 4 is fixed on the surface of a base 6 so that the driving coil 3 adhered to the actuator body 2 and the permanent magnet 4 are opposite to each other. A shaft 7 is pressed and fitted in a depression formed on the base 6 so that the shaft 7 projects from the base 6. The shaft 7 is engaged with a cylindrical supporting member 8 and the cylindrical supporting member 8 is engaged with the bearings 5 provided in the concave portion 2c of the actuator body 2. That is, the cylindrical supporting member 8 is put between the shaft 7 and the bearings 5 so as to rotatably support the actuator body 2. Therefore, the actuator body 2 is pivoted on the shaft 7 so that the magnetic head integrated with the actuator body 2 is moved in the radial direction of the magnetic disc.

In the actuator described above, the driving coil 3 is adhered to the rear end portion 2b of the actuator body 2 by an adhesive such as an UV hardening adhesive which is hardened adhesive when the UV hardening is subjected to an ultraviolet (UV) ray. When the adhesive is chemically changed, a gas is generated from the adhesive. Therefore, the magnetic disc can be corroded by the gas generated from the adhesive.

Thus, the actuator described above is produced as follows.

The driving coil 3 is adhered to the actuator body 2 by the UV hardening adhesive, and then the ultraviolet ray is applied to the UV hardening adhesive between the driving coil 3 and the actuator body 3 so that the UV hardening adhesive is cured. After that, the driving coil 3 and the actuator 2 integrated with each other are heated so that the gas is forcefully generated from the UV hardening adhesive. That is, a gas removing process in which the gas is forcefully generated from the UV hardening adhesive is performed. After the gas removing process is completed, the actuator body 2 is engaged with the cylindrical supporting member 8.

However, if the actuator body 2 is heated after the bearings 5 are pressed and fitted in the concave portion 2c of the actuator body 2, a quality of a grease with which the bearings 5 is filled deteriorates. Thus, the gas removing process in which the actuator body 2 and the driving coil 3 are heated must be performed before the bearings 5 are mounted in the concave portion 2c of the actuator body 2. That is, first, the driving coil 3 is adhered to the actuator body 2, second the driving coil 3 and the actuator body 2 are heated in the gas removing process, and third, the bearings 5 are mounted in the concave portion 2c of the actuator body 2.

In the conventional method for producing the actuator 1, as has been described above, it is impossible to assemble the actuator body 2, the driving coil 3 and the bearings 5 in one production process. That is, it is impossible to efficiently assemble the actuator body 2, the driving coil 3 and the bearings 5, so that the cost for the production of the actuator 1 is increased.

SUMMARY OF THE INVENTION

Accordingly, a general object of the present invention is to provide a novel and useful actuator for moving a recording head and a method for producing the same in which the disadvantages of the aforementioned prior art are eliminated.

A more specific object of the present invention is to provide an actuator for moving a recording head in which it is possible to efficiently assemble the actuator.

The above objects of the present invention are achieved by an actuator for moving a recording head in a radial direction of a recording disc, the recording head writing information on the recording disc and/or reading the information therefrom, the actuator comprising: a first member having a first actuator member and a driving device adhered to the first actuator member by an adhesive, the first actuator member having a first engagement portion; and a second member having a second actuator member and a bearing mechanism which is provided to the second actuator member and engaged with a shaft member fixed on a base, the second actuator member having a second engagement portion which is engaged with the first engagement portion of the first actuator member so that the first member and the second member are integrated with each other, wherein the recording head is mounted on at least either the first actuator member or the second actuator member, and wherein the first member and second member pivot on the shaft member engaged with the bearing mechanism of the second member due to an operation of the driving device of the first member so that the recording head is moved in the radial direction of the recording disc.

The above objects of the present invention are also achieved by a method for producing an actuator for moving a recording head in a radial direction of a recording disc, the recording head writing information on the recording disc and/or reading the information therefrom, the method comprising the following steps (a) through (c) of: (a) forming a first member having a first actuator member and a driving device, the first actuator member having a first engagement portion, the step (a) comprising the sub-steps of adhering the driving device to the first actuator member by an adhesive, and heating the first actuator member and the driving device adhered to the first actuator member so that a gas is forcefully generated from the adhesive, so that the first member is formed; (b) providing a bearing mechanism to a second actuator member having a second engagement portion, so that the second actuator member and the bearing mechanism are formed into a second member; and (c) engaging the first engagement portion of the first actuator member and the second engagement portion of the second actuator member with each other so that the first member and the second member are integrated with each other, wherein the recording head is mounted on at least either the first actuator member or the second actuator member, and wherein the bearing mechanism of the second member is engaged with a shaft member fixed on a base, and the first member and second member pivot on the shaft member engaged with the bearing mechanism of the second member due to an operation of the driving device of the first member so that the recording head is moved in the radial direction of the recording disc.

Additional objects, features and advantages of the present invention will become apparent from the following detailed description when read in conjunction with the accompanying drawings

DESCRIPTION OF THE PREFERRED EMBODIMENTS

A description will now be given of an embodiment of the present invention with reference to FIGS. 2 through 5.

Figure 1:
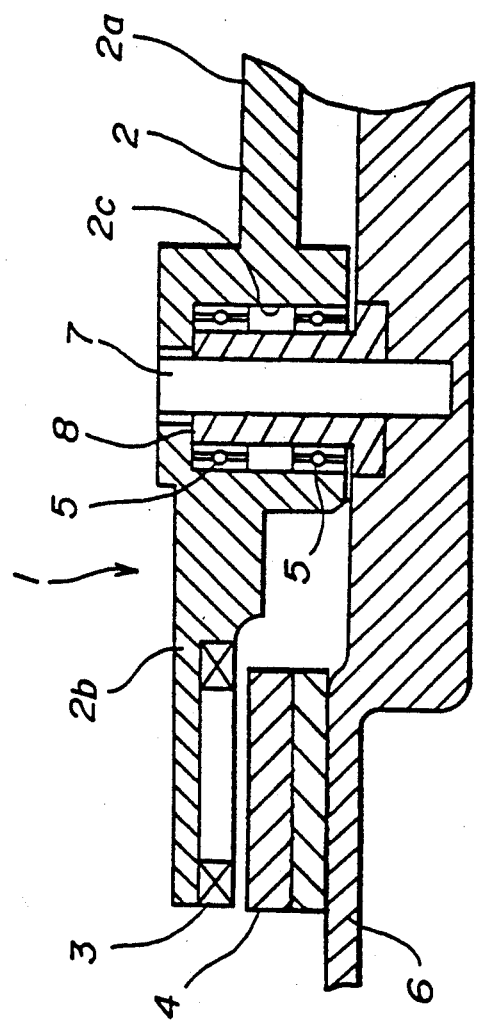
FIG. 1 is a longitudinal sectional view showing a structure of a conventional actuator for moving a recording head.
Figure 2:
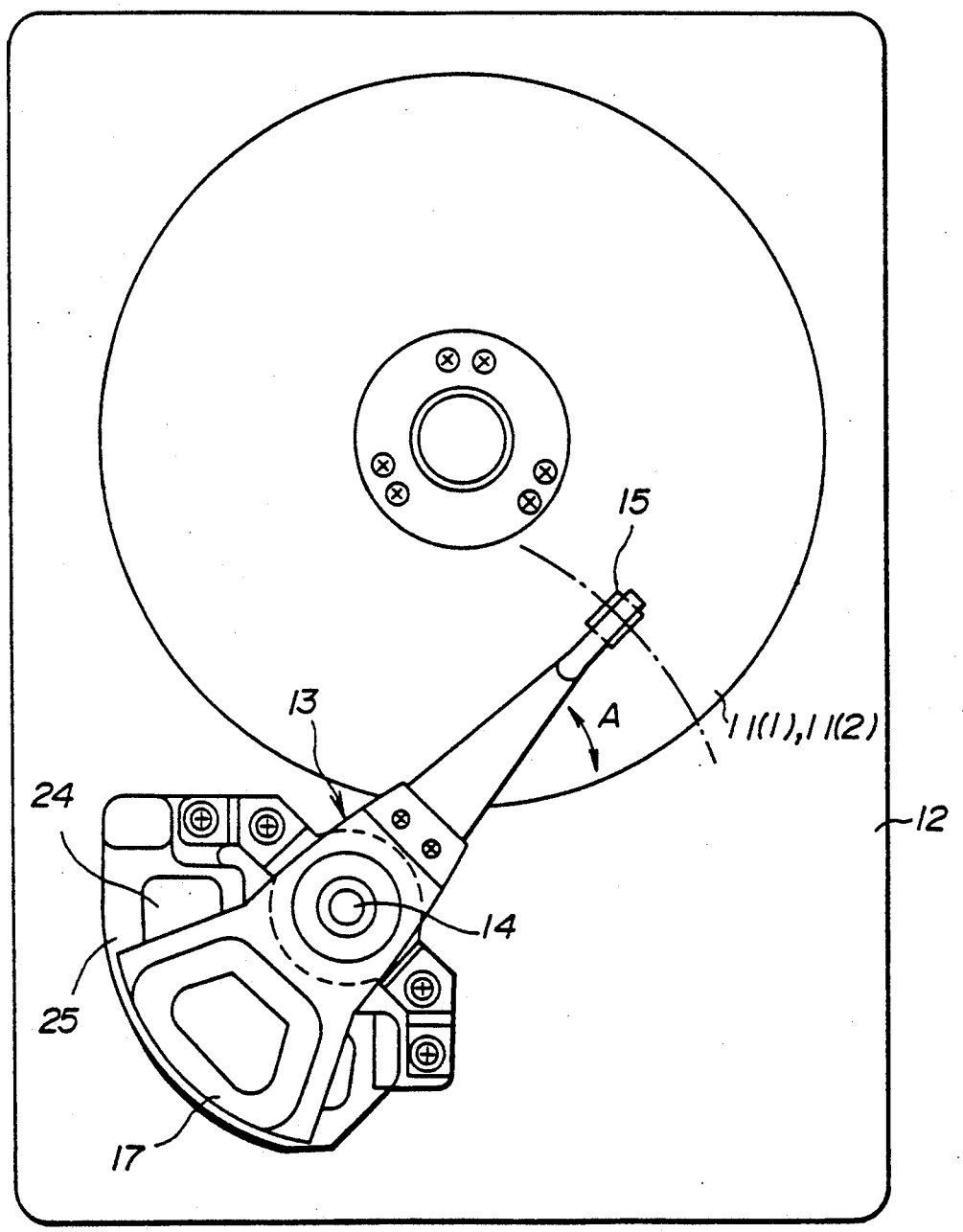
FIG. 2 is a plan view showing a magnetic disc apparatus having an actuator according to an embodiment of the present invention.
Figure 3:
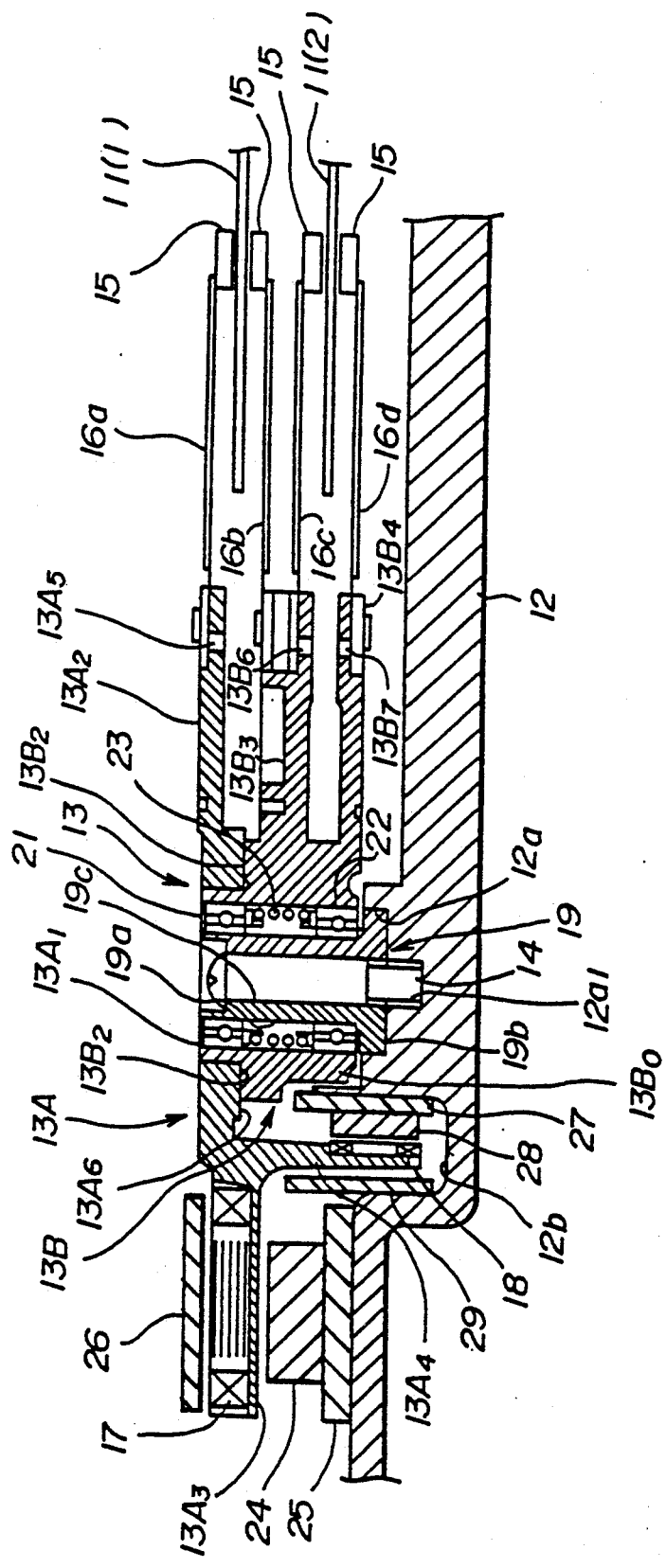
FIG. 3 is a longitudinal sectional view showing a detailed structure of the actuator shown in FIG. 2.

Referring to FIG. 3, which shows a magnetic disc apparatus having an actuator for moving a magnetic head, a first disc 11(1) and a second disc 11(2) are located so as to be stacked at intervals above a base 12 formed of aluminum alloy. A driving motor (not shown in FIG. 3) is located under the base 12 so that the driving motor rotates the first and second discs 11(1) and 11(2). An actuator 13 is supported by a bolt 14 so as to pivot on the bolt 14. Magnetic heads 15 are provided on a front end of the actuator 13 so that each of the magnetic heads 15 is located adjacent to the surface of one of the first and second discs 11(1) and 11(2). When the actuator 13 pivots on the bolt 14, the magnetic heads 15 are moved in a direction indicated by an arrow A shown in FIG. 2. That is, the magnetic heads 15 are moved in the radial direction of each of the first and second discs 11(1) and 11(2) by the actuator 13.

A detailed description will now be given of the structure of the actuator 13 described above with reference to FIGS. 3 through 5.

Figure 4:
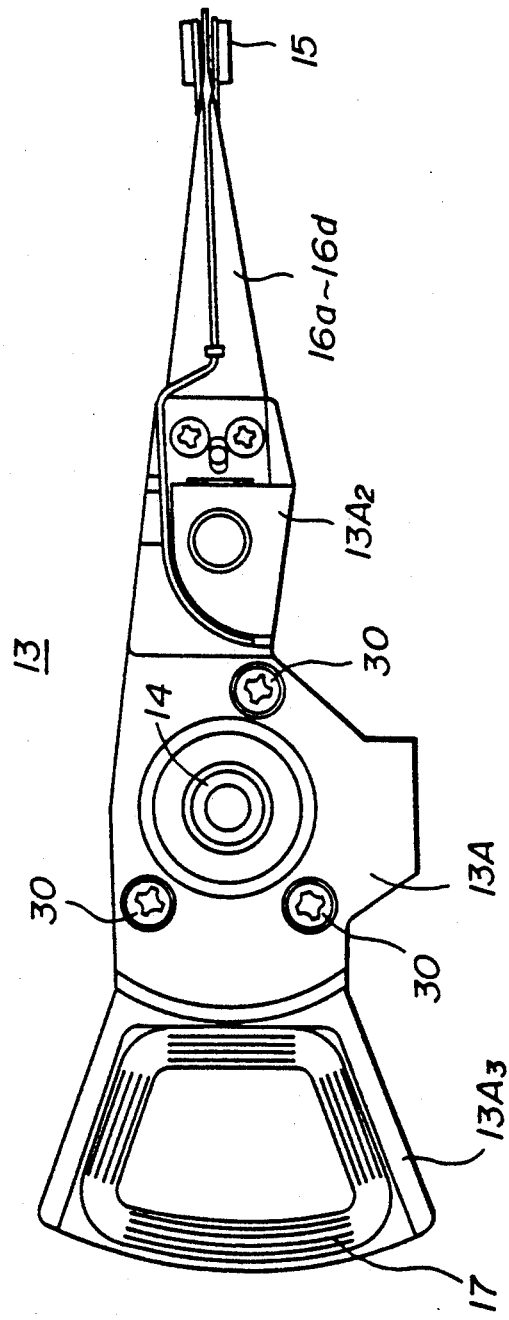
FIG. 4 is a plan view showing the actuator.
Figure 5:
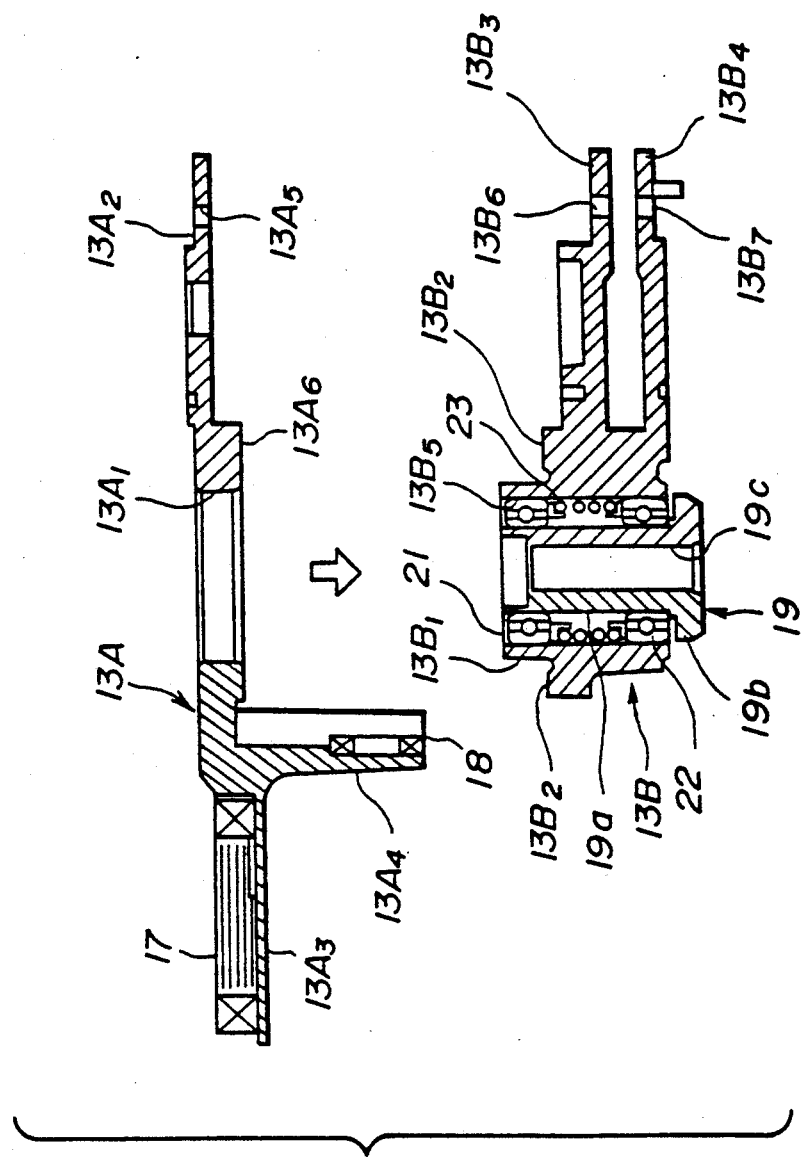
FIG. 5 is an exploded sectional view illustrating a method for assembling the actuator according to an embodiment of the present invention.

Referring to FIGS. 3 through 5, which show the detailed structure of the actuator 13, the actuator 13 has a first actuator body 13A and a second actuator body 13B. A through hole 13A1 is formed on an median portion of the first actuator body 13A. A mounting portion 13A2 is formed on an front end portion of the first actuator body 13A. A head arm 16a is fixed on the mounting portion 13A2 of the first actuator body 13A.

The magnetic head 15 is provided on a front end of the head arm 16a. The magnetic head 15 faces the obverse of the first magnetic disc 11(1). A driving coil 17 is adhered to a rear end portion 13A3 of the first actuator body 13A by the UV hardening adhesive. The first actuator body 13A also has an extension portion 13A4 projecting from a portion between the rear end portion of the actuator body 13A3 and the median portion thereof. A detecting coil 18 for detecting the moving speed of the magnetic heads 15 is adhered to the extension portion 13A4 of the first actuator body 13A, in the same manner as the driving coil 17.

The second actuator body 13B has a cylinder member 13B0. The outer surface of the cylinder member 13B0 has an engagement surface 13B1 and a supporting surface 13B2. The engagement surface 13B1 is formed between the top surface of the cylinder member 13B0 and the supporting member, and the top surface of the cylinder member 13B0, the engagement surface 13B1 and the supporting surface 13B2 are continuous. The supporting surface 13B2 is parallel to the top surface of the cylinder member 13B0 and projects from the engagement surface 13B1. The distance between the top surface of the cylinder member 13B0 and the supporting surface 13B2 is substantially equal to the length of the through hole 13A1 of the first actuator body 13A. The engagement surface 13B1 of the cylinder member 13B0 is engaged with the through hole 13A1 of the first actuator body 13A and the supporting surface 13B2 of the cylinder member 13B0 supports the first actuator body 13A. Since the distance between the top surface of the cylinder member and the supporting surface 13B2 is substantially equal to the length of the through hole 13A1 of the first actuator body 13A, the cylinder member 13B0 is not projected from the surface of the first actuator body 13A.

The second actuator body 13B also has two mounting members 13B3 and 13B4. Each of the mounting members 13B3 and 13B4 projects from the outer surface of the cylinder member 13B0 so as to be parallel to each other. On the mounting member 13B3, two head arms 16b and 16c are fixed so as to be stacked at predetermined interval. Magnetic heads 15 are mounted on the head arms 16b and 16c so that the magnetic head mounted on the head arm 16b faces the reverse of the first magnetic disc 11(1) and the magnetic head mounted on the head arm 16c faces the observe of the second magnetic disc 11(2). On the mounting member 13B4, a head arm 16d is fixed so as to be parallel to the head arms 16b and 16c fixed on the mounting portion 13B3. A magnetic head 15 is mounted on the head arm so as to face the reverse of the second magnetic disc 11(2). A bearing through hole 13B5 is formed on the inside of the cylindrical member 13B0. A first bearing 21 is pressed and fit in the top portion of the bearing through hole 13B5 and a second bearing 22 is pressed and fitted in the bottom portion of the bearing through hole 13B5. A coil spring 23 is provided between the first bearing 21 and the second bearing 22 so that the spring 23 prevents the first and second bearings 21 and 22 from sliding in the bearing through hole 13B5 of the second actuator body 13B.

A cylindrical supporting member 19 has an engagement portion 19a and a flange 19b. The engagement portion 19a of the cylindrical supporting member 19 is engaged with the first and second bearings 21 and 22 and the flange 19b is engaged with a mounting hole 12a formed on a base 12. Thus, the second actuator body 13B is supported, by the cylindrical supporting member 19, so as to be capable of pivoting on the cylindrical supporting member 19. A mounting through hole 19c is formed on the inside of the cylindrical supporting member 19, and a bolt 14 is inserted into the mounting through hole 19c and engaged with a tapped hole 12a1 formed on the mounting hole 12a so that the cylindrical supporting member 19 is completely fixed to the base 12 by the bolt 14.

A lower yoke 25 and a permanent magnet 24 are stacked on the base 12 so that the permanent magnet 24 faces the rear end portion 13A3, on which the driving coil 17 is adhered, of the first actuator body 13A. An upper yoke 26 is provided above the driving coil 17. The lower yoke 25, the upper yoke 26 and the permanent magnet 24 form a magnetic circuit. A groove 12b is formed on the base 12, and the end of the extension portion 13A4 is positioned in the groove 12b. The groove 12b has a circular arc shape corresponding to a locus of the extension portion 13A4 which is formed when the first actuator body 13A is rotated. Yokes 27 and 29 are provided on inner walls of the groove 12b so as to be opposite to each other. A permanent magnet 27 is provided on the yoke 28 so as to face the detecting coil 18 fixed to the extension portion 13A4 of the first actuator body 13A. That is, the detecting coil 18 is moved between the permanent magnet 28 and the yoke 29. Therefore, the detecting coil 18 generates an induced electromotive force corresponding to a moving speed of the actuator 13 (the magnetic heads 15). The moving speed of the magnetic heads 15 is detected on the basis of the induced electromotive force generated by the detecting coil 18.

A description will now be given of a production process of the actuator 13 described above.

First, in the second actuator body 13B, the bearings 21 and 22 are pressed and fitted in the bearing through hole 13B5 of the second actuator body 13B and the supporting member 19 is engaged with the bearings 21 and 22. The head arms 16b through 16d are mounted on the second actuator body 13B.

Next, in the first actuator body 13A, the driving coil 17 is adhered to the rear end portion 13A3 of the first actuator body 13A by the UV hardening adhesive and the detecting coil 18 is adhered to the extension portion 13A4 thereof in the same manner as the driving coil. And then, the UV hardening adhesive is subjected to the ultraviolet (UV) ray, so that the UV hardening adhesive is hardened. After that, the first actuator body 13A provided with the driving coil 17 and the detecting coil 18, as shown in FIG. 5, is heated. The UV hardening adhesive is chemically changed and the gas is forcefully generated from the UV hardening adhesive and removed.

Next, the engagement surface 13B1 of the second actuator body 13B is engaged with the through hole 13A1 of the first actuator body 13A and a bottom surface 13A6 of the first actuator body 13A comes in contact with the supporting surface 13B2 of the second actuator body 13B. Thus, the first actuator body 13A is supported by the supporting surface 13B2 of the second actuator body 13B. And then, a locating rod (not shown in FIG. 3) is made to pass through a locating hole 13A5 formed on the mounting portion 13A2 of the first actuator body 13A and locating holes 13B3 and 13B4 formed on the mounting portions 13B6 and 13B7 of the second actuator body 13B, so that the first actuator body 13A and the second actuator body 13B are located with respect to each other. After that, the first actuator body 13A and the second actuator body 13B are fixed to each other by three screws 30 as shown in FIG. 4. As a result, the first actuator body 13A and the second actuator 13B are integrated with each other. The screws 30 are provided to the actuator 13 so that the center of gravity of the three screws 30 is the center of the rotation of the actuator 13. And then the head arm 16a is fixed on the mounting portion 13A1 of the first actuator body.

After that, the second actuator body to which the bearings 21 and 22 and the supporting member 19 are provided is mounted on the base 12, as shown in FIG. 3. That is, the flange 19a of the supporting member 19 is engaged with the mounting hole 12a formed on the base 12, and the supporting member 19 is completely fixed on the base 12 by the bolt 14.

According to the embodiment described above, the first actuator body 13A provided with the driving coil 17 and the second actuator body 13B provided with the bearings 21 and 22 can be separately produced, so that even if the first actuator body is heated to make the gas forcefully generate from the adhesive for adhering the driving coil 17 to the first actuator body, the quality of the grease with which the bearings are filled can be prevented from deteriorating. Thus, it is possible to successively perform a process where the driving coil 17 is adhered to the first actuator body 13A and a process where the bearings 21 and 22 filled with the grease are provided to the second actuator body 13B.

In addition, the cylinder member 13B0 of the second actuator 13B in which the bearings 21 and 22 are housed is engaged with the through hole 13A1 of the first actuator body 13A so that the actuator 13 is formed. Thus, the thickness of the actuator 13 can be as small as possible in the state where the distance between the bearings 21 and 22 is as great as possible. That is, the thickness of the magnetic disc apparatus having the actuator 13 described above can be smaller than that of the conventional magnetic disc apparatus The present invention can be also applied to the magnetic disc apparatus having flexible discs for recording the information.

The present invention is not limited to the aforementioned embodiment, and variations and modifications may be made without departing from the scope of the claimed invention.

What is claimed is:

1. An actuator for moving a recording head in a radial direction of a recording disc, said recording head writing information on said recording disc and/or reading the information therefrom, said actuator comprising:
   a first member having,
   a first actuator member and a driving device adhered to said first actuator member by an adhesive, said first actuator member having a first engagement portion; and
   a second member having,
   a second actuator member and a bearing mechanism which is provided to said second actuator member and engaged with a shaft member fixed on a base, said second actuator member having a second engagement portion which is engaged with said first engagement portion of said first actuator member so that said first member and said second member are integrated with each other,
   wherein at least one recording head is mounted on said second actuator member, and wherein said first member and second member pivot on said shaft member engaged with said bearing mechanism of said second member due to an operation of said driving device of said first member so that the recording head is moved in the radial direction of said recording disc.

2. An actuator as claimed in claim 1, wherein said first engagement portion has a through hole formed on said first actuator member, said second actuator member has a cylinder member in which said bearing mechanism is provided, and said second engagement portion has an engagement surface and a supporting surface which are formed on an outer surface of said cylinder member, and wherein said engagement surface of said cylinder member is engaged with said through hole formed on said first actuator member and said first actuator member is supported by said supporting surface of said cylinder member.

3. An actuator as claimed in claim 2, wherein the length of said through hole formed on said first actuator member is substantially equal to the length of a part of cylinder member which is covered by said engagement surface.

4. An actuator as claimed in claim 2, wherein said bearing mechanism has two bearings and a coil spring, and wherein said bearings are inserted in said cylinder member and said coil spring is provided between said bearings so that said coil spring prevents the bearings from sliding in the cylinder member.

5. An actuator as claimed in claim 1, wherein said first member has an extension portion formed on said first actuator member and a detecting device for detecting a moving speed of said recording head, said detecting device being provided to said extension portion.

6. An actuator as claimed in claim 5, wherein said detecting device is adhered to said extension portion of said first actuator member by an adhesive.

7. A method for producing an actuator for moving a recording head in a radial direction of a recording disc, said recording head writing information on said recording disc and/or reading the information therefrom, said method comprising the following steps (a) through (c) of:

(a) forming a first member having a first actuator member and a driving device, said first actuator member having a first engagement portion, said step (a) comprising steps of
   adhering said driving device to said first actuator member by an adhesive, and
   heating said first actuator member and said driving device adhered to said first actuator member so that a gas is forcefully generated from said adhesive,
   so that said first member is formed;

(b) providing a bearing mechanism to a second actuator member having a second engagement portion, so that said second actuator member and said bearing mechanism are formed into a second member; and (c) engaging said first engagement portion of said first actuator member and said second engagement portion of said second actuator member with each other so that said first member and said second member are integrated with each other,
   wherein at least one recording head is mounted on said second actuator member, and wherein said bearing mechanism of said second member is engaged with a shaft member fixed on a base, and said first member and second member pivot on said shaft member engaged with said bearing mechanism of said second member due to an operation of said driving device of said first member so that the recording head is moved in the radial direction of said recording disc.

8. A method as claimed in claim 7, wherein said adhesive for adhering said driving device to said first actuator member is a UV hardening adhesive which is hardened when the UV hardening adhesive is subjected to an ultraviolet ray, and wherein said step (a) further comprises a step of subjecting said UV hardening adhesive to the ultraviolet ray before the step of heating said first actuator member and said driving device.

9. An actuator for moving a recording head in a radial direction of a recording disc, said recording head writing information on said recording disc and/or reading the information therefrom, said actuator comprising:
   a first member having,
   a first actuator member and a driving device mounted on said first actuator member, said first actuator member having a first engagement portion;
   a second member having,
   a second actuator member provided with a second engagement portion which is engaged with said first engagement portion of said first actuator member so that said first member and said second member are integrated with each other; and
   at least one recording head mounted on said second actuator member,
   wherein said first member and second member are rotatably supported by a supporting mechanism, and due to an operation of said driving device of said first member, the recording head is moved in the radial direction of said recording disc.

* * * * *